United States Patent
Meyer et al.

(10) Patent No.: US 11,104,424 B2
(45) Date of Patent: Aug. 31, 2021

(54) STRUT FOR THE LANDING GEAR OF AN AIRCRAFT

(71) Applicant: Liebherr-Aerospace Lindenberg GmbH, Lindenberg (DE)

(72) Inventors: Joerg Meyer, Baienfurt (DE); Anton Straub, Constance (DE); Peet Vergouwen, Beek en Donk (NL)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 341 days.

(21) Appl. No.: 15/747,739

(22) PCT Filed: Jul. 1, 2016

(86) PCT No.: PCT/EP2016/001130
§ 371 (c)(1),
(2) Date: Jan. 25, 2018

(87) PCT Pub. No.: WO2017/016633
PCT Pub. Date: Feb. 2, 2017

(65) Prior Publication Data
US 2018/0215461 A1    Aug. 2, 2018

(30) Foreign Application Priority Data
Jul. 29, 2015 (DE) .................... 20 2015 005 362.9

(51) Int. Cl.
*B64C 25/02* (2006.01)
*B64C 25/10* (2006.01)
*B64F 5/10* (2017.01)

(52) U.S. Cl.
CPC .............. *B64C 25/02* (2013.01); *B64C 25/10* (2013.01); *B64F 5/10* (2017.01)

(58) Field of Classification Search
CPC ......... B64C 25/02; B64C 25/06; B64C 25/08; B64C 25/10; B64C 25/12; B64C 25/04; B29C 70/085
See application file for complete search history.

(56) References Cited

U.S. PATENT DOCUMENTS

| 1,833,468 A | * | 11/1931 | Miyo | ...................... B60R 9/06 |
| | | | | 244/104 LS |
| 1,884,596 A | * | 10/1932 | De La Cierva | ......... B64C 25/06 |
| | | | | 244/17.17 |

(Continued)

FOREIGN PATENT DOCUMENTS

| DE | 102007019052 A1 | 9/2008 |
| DE | 102012001054 A1 * | 7/2013 | ............. B64C 25/02 |

(Continued)

OTHER PUBLICATIONS

ISA European Patent Office, International Search Report Issued in Application No. PCT/EP2012/064977, dated Nov. 6, 2012, WIPO, 6 pages.

*Primary Examiner* — Christopher D Hutchens
(74) *Attorney, Agent, or Firm* — McCoy Russell LLP

(57) ABSTRACT

The invention relates to a strut for the landing gear, preferably the nose landing gear, of an aircraft, which strut comprises a structure branched in a Y shape, wherein the Y-shaped structure is produced as a multi-piece structure and comprises at least two bars, wherein a first bar forms the first branch of the structure and a second bar forms the second branch of the structure and wherein both bars are composed partially or completely of a fiber composite material.

18 Claims, 11 Drawing Sheets

(56) References Cited

U.S. PATENT DOCUMENTS

| | | | | |
|---|---|---|---|---|
| 2,550,028 | A * | 4/1951 | Wells | B64C 25/10 |
| | | | | 244/102 R |
| 2,752,112 | A * | 6/1956 | Payne, Jr. | B64C 25/10 |
| | | | | 244/102 R |
| 2,982,499 | A * | 5/1961 | Cameron-Johnson | ......................... |
| | | | | B64C 25/14 |
| | | | | 244/102 R |
| 4,372,506 | A * | 2/1983 | Cronk | B64C 25/04 |
| | | | | 244/100 R |
| 4,828,285 | A | 5/1989 | Foret et al. | |
| 6,264,139 | B1 * | 7/2001 | Dazet | B64C 25/10 |
| | | | | 244/100 R |
| 8,083,180 | B2 | 12/2011 | Meyer et al. | |
| 2007/0007386 | A1 * | 1/2007 | Coupe | F16C 7/026 |
| | | | | 244/102 A |
| 2008/0230650 | A1 * | 9/2008 | Meyer | B64C 25/10 |
| | | | | 244/100 R |
| 2013/0112808 | A1 * | 5/2013 | Guering | B64C 25/20 |
| | | | | 244/102 SS |
| 2014/0183785 | A1 * | 7/2014 | Masson | B29C 70/48 |
| | | | | 264/258 |

FOREIGN PATENT DOCUMENTS

| | | | | |
|---|---|---|---|---|
| DE | 102012001054 A1 | 7/2013 | | |
| DE | 102012001055 A1 | 7/2013 | | |
| EP | 1972550 A2 | 9/2008 | | |
| GB | 1239919 A * | 7/1971 | | B64C 25/10 |
| WO | WO-2010028720 A2 * | 3/2010 | | B29C 70/36 |
| WO | 2013017603 A1 | 2/2013 | | |
| WO | 2013107650 A1 | 7/2013 | | |
| WO | 2013107651 A1 | 7/2013 | | |

\* cited by examiner

FIG. 4A
FIG. 4B
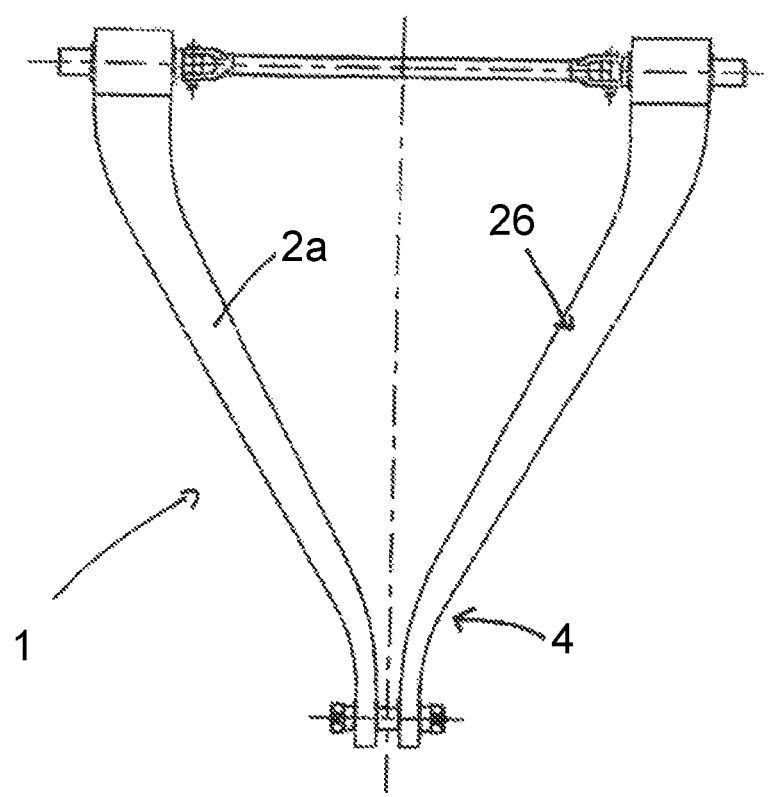

STRUT FOR THE LANDING GEAR OF AN AIRCRAFT

CROSS-REFERENCE TO RELATED APPLICATION

The present application is a U.S. National Phase of International Patent Application Serial No. PCT/EP2016/001130, entitled "STRUT FOR THE LANDING GEAR OF AN AIRCRAFT," filed on Jul. 1, 2016. International Patent Application Serial No. PCT/EP2016/001130 claims priority to German Utility Model Application No. 20 2015 005 362.9, filed on Jul. 29, 2015. The entire contents of each of the abovementioned applications are hereby incorporated by reference in their entirety for all purposes.

TECHNICAL FIELD

The present invention relates to a strut for the landing gear and preferably for the nose landing gear of an aircraft and to a method of manufacturing such a strut.

BACKGROUND AND SUMMARY

The landing gear is a vital and robust assembly of the aircraft for which there is no redundancy. In order also to be able to absorb the shock of a very poor landing uncomplainingly and reliably, only extremely strong components and materials are used in the construction of these technically sophisticated designs. The landing gear is therefore a relatively heavy part of the aircraft. The landing gears can, for example, amount to up to 5% of the starting weight of an aircraft.

Against this background, it is desirable to optimize the design of the landing gear such that it can reliably absorb shocks and such that it simultaneously does not have too great a weight. Suitable landing gears having struts of fiber composite materials are known, for example, from DE 10 2012 001 055 A1 and DE 10 2012 001 054 A1.

Starting from this prior art, it is the object of the invention to provide an improved strut that is even more robust and that can additionally be manufactured in a simple manner.

To achieve this object, the invention provides a strut for the landing gear and preferably for the nose landing gear of an aircraft that comprises a structure branched in a Y shape, wherein the Y-shaped structure is produced in multiple parts and comprises at least two bars, wherein a first bar forms the first branch of the structure and a second bar forms the second branch of the structure, and wherein both bars partly or completely comprise a fiber composite material.

The Y-shaped structure is therefore not produced as a single, integral component, but is rather composed of at least two separate bars. A first bar forms a first branch of the structure and does not extend onto the second branch of the structure. A second bar forms a second branch of the structure and does not extend onto the first branch of the structure.

Support points for fixing the strut to the fuselage are preferably provided at the branches of the Y-shaped structure. The connection to the fuselage can take place directly or by means of further intermediate pieces. Holes or axial pins disposed in the plane of the structure are, for example, provided at the branches for this purpose.

Support points for fixing further landing gear parts are provided at the trunk of the Y-shaped structure. Holes or axial pins disposed in the plane of the structure are, for example, provided at the trunk for this purpose.

In an embodiment, the two bars are identical or almost identical. Almost identical should mean that the shape is generally identical, but that there can be differences in the configuration of the connection points. In an embodiment, the two, preferably identical, bars are arranged in linear symmetry or minor symmetry with respect to one another in the structure. The symmetry line corresponds to the trunk axis. The minor plane is perpendicular to the plane of the Y-shaped structure and is disposed in the trunk axis. An identical configuration of the two bars produces advantages in production.

In an embodiment, the structure furthermore comprises at least one cross web that extends between the branches. The cross web can, like also the bars, partly or completely comprise a fiber composite material.

The cross web is preferably likewise an individual component and not an integral part of one of the bars. The cross web can be connected to the bar in an articulated manner or free of bends. The connection can, for example, take place such that respective aligned holes are provided in both components at the connection points between the cross web and the bars, through which holes a bolt is inserted. In an embodiment, the holes are normal to the plane of the structure. Provision can alternatively or additionally be made that the connection takes place via bearing pivots that also serve the connection of the strut to the fuselage. The cross web has the task of increasing the torsional stiffness of the structure.

In an embodiment, the two bars are connected to one another at the branching point or at the trunk of the Y-shaped structure. The connection at the branching point can, for example, take place using a bolt extending normal to the plane of the strut. The connection can naturally also take place using a plurality of pins extending normal to or in the plane.

Alternatively or additionally, the connection to the trunk can take place using a bolt extending in the plane of the strut.

The connection of the two bars at the branching point can be symmetrical (at both sides) or asymmetrical (at one side).

In an embodiment, an auxiliary body is arranged between the bars at the branching point, said auxiliary body comprising two oppositely disposed bearing surfaces that contact the inner sides of the bars. The auxiliary body can, like also the bars, partly or completely comprise a fiber composite material. The auxiliary body serves as a spacer and as means for fixing the spacing between the bars.

The auxiliary body is preferably configured and arranged in minor symmetry with respect to the trunk axis. The connection between the auxiliary body and the bars can, for example, take place in that the auxiliary body has a hole aligned with the holes of the bars and in that the bolt that connects the two bars is also inserted through this hole.

The auxiliary body can, for example, be configured as a plate having a triangular or funnel-like design to map the increasing spacing of the inner sides of the bars by the bearing surfaces and optionally the curvature of the inner sides of the bars at the branching point. The bearing surfaces can, for example, be extended with respect to the thickness of the auxiliary body to achieve a larger support surface. In this case, the clamping body can be H-shaped or U-shaped in cross-section, for example. The auxiliary body can serve to set the spacing between the two bars and to increase the torsional stiffness of the strut.

In an embodiment, the bars have an inwardly open recess at the branching point. Provision can be made that the auxiliary body is received in this recess, where present.

In an embodiment, the trunk of the Y-shaped structure is produced in two parts, with the first bar forming the first part of the trunk and the second bar forming the second part of the trunk.

In an embodiment, the bars are curved in an S shape, with the trunk sections of both bars extending in parallel, with the bars then moving away from one another in the region of the branches, and with an end section in which the bars in turn extend in parallel being present at the tip of the branches.

As stated above, the bars partly or completely comprise a fiber composite material. It is conceivable to use a fiber/plastic composite having a high specific strength and stiffness as well as a low density. This is achieved, for example, in that the material comprises long or endlessly extending reinforcement fibers oriented suitable for strain. Glass fibers, aramid fibers or carbon fibers can be considered, for example. They are preferably integrated into a thermoplastic or thermosetting plastic matrix. A carbon fiber reinforced plastic is particularly preferred.

In an embodiment, at least one component of the strut has reinforcements of metal, hard metal, ceramic material or the like. Provision can, for example, be made that the bars have annular reinforcements in the region of the holes to avoid damage to the rigid fiber composite material. Alternatively or additionally, the holes of the cross web and/or of the auxiliary body can also have annular reinforcements in the region of the holes. Provision can furthermore be made that the auxiliary body and/or the bars have a reinforcement in the region of the bearing surfaces to avoid damage.

The bars and/or the cross-web can be designed as section supports to have a smaller mass with an unchanged stability. Furthermore, section supports can be manufactured in a simple manner as part of a method in accordance with the invention described further below. Examples for suitable sections include round-edged pipes or multi-edged pipes, for example square pipes, U sections, T sections, double T sections, or L sections.

The invention further relates to a method of manufacturing a strut in accordance with one of the preceding claims, wherein the manufacture of the bars takes place as part of an RTM process (RTM stands for resin transfer molding), and wherein the complete bars are subsequently connected to one another.

A semifinished fiber product is here placed into a cavity, the semifinished fiber product is subsequently overmolded with a molding material, and the created composite component is hardened under the effect of heat and pressure. The molding material can, for example, be a cross-linked plastic material that hardens into a thermosetting plastic. The semifinished fiber product can comprise or consist of carbon fibers. The cavity can be evacuated prior to the injection of the molding material. If the component should also include reinforcements, for example ring reinforcements in the region of the holes or reinforcements in the region of the contact surfaces with the auxiliary body, corresponding parts such as metal parts can be placed into the cavity.

The holes can already be worked into the components during the RTM process or subsequently, for example by drilling.

Alternatively to the RTM process, that is to a vacuum infusion process, the manufacture of the bars can also take place as part of a further method in accordance with the invention by thermoplastic manufacture as part of an automated tape laying process (ATL).

The cross web partly or completely comprising a fiber composite material and/or the auxiliary body partly or completely comprising a fiber composite material can be manufactured in an identical manner as part of an RTM process or of an automated tape laying process and can be subsequently connected to the bars.

The connection of the individual parts can take place by bolting to the holes.

The invention further relates to an aircraft landing gear and preferably to a nose landing gear having a strut in accordance with the invention and to a method of manufacturing such a landing gear comprising the manufacture in accordance with the invention of a strut and the installation of such a strut.

Further details and advantages result from the embodiment discussed in the following with reference to the Figures.

BRIEF DESCRIPTION OF THE FIGURES

FIG. 4A shows a view of a third embodiment of a strut in accordance with the invention.

FIG. 4B shows a side view of FIG. 4A.

DETAILED DESCRIPTION

Figure 1:
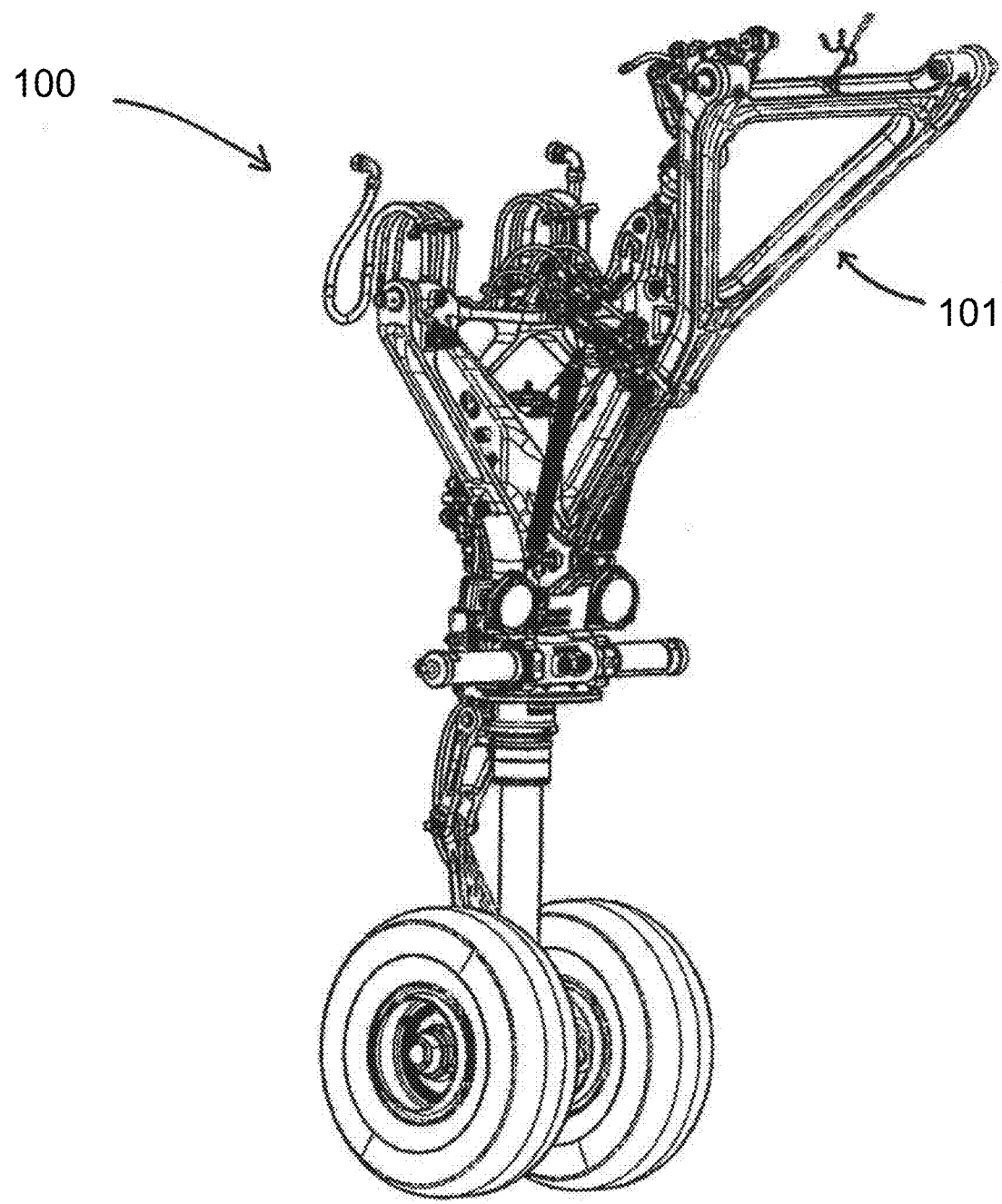
FIG. 1 shows an example nose landing gear of an aircraft comprising a strut of the category from the prior art.

FIG. 1 shows a nose landing gear 100 of an aircraft comprising a Y-shaped strut 101 of the category, but not in accordance with the invention. The two branches of the strut 101 are each connected to the aircraft body and the trunk of the strut is connected to further elements of the nose landing gear 100. The Y-shaped strut of the present invention is suitable to replace the strut of the prior art shown in FIG. 1.

Figure 2A:
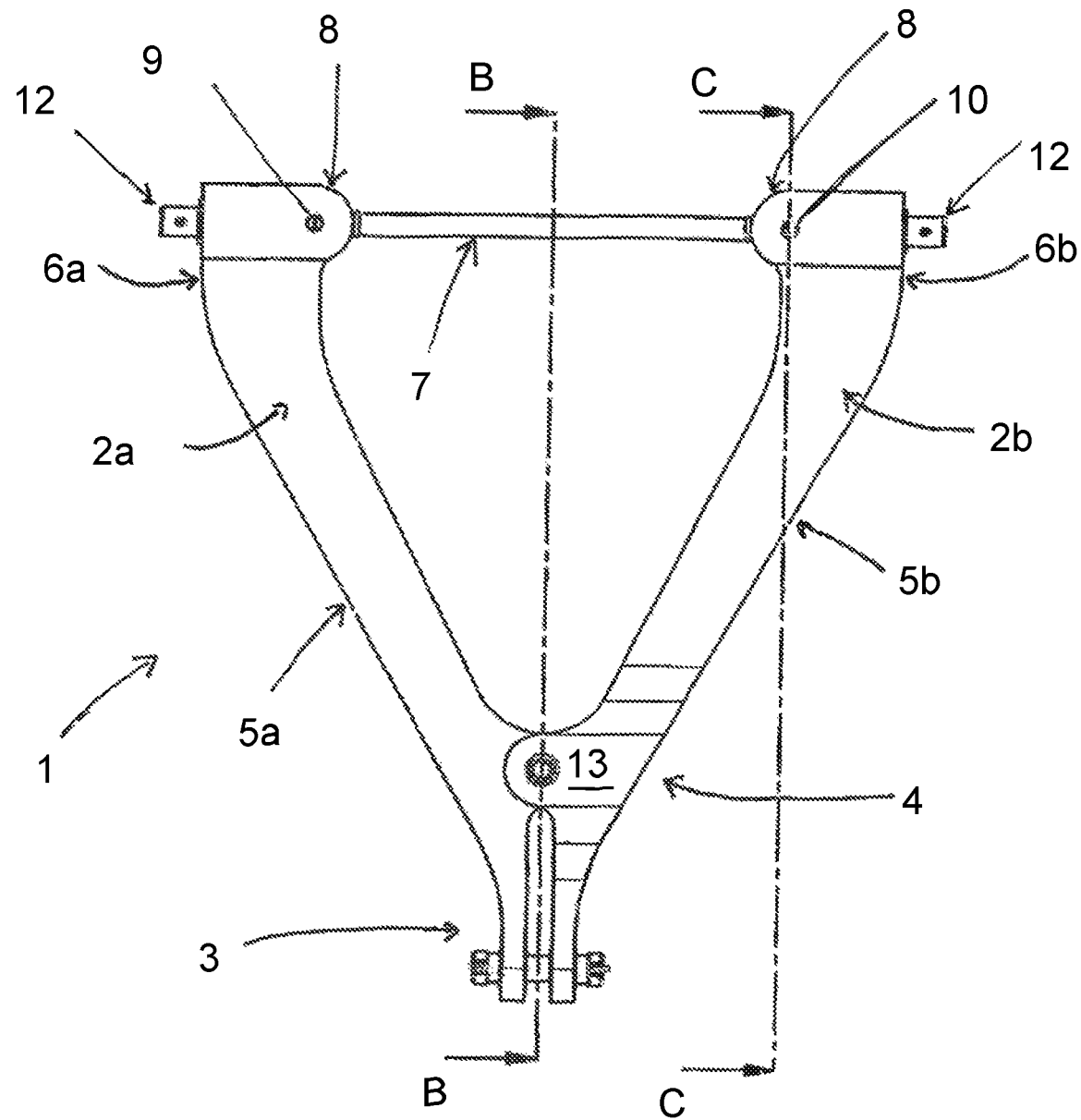
FIG. 2A shows a plan view of a first embodiment of a strut in accordance with the invention.
Figure 2B:
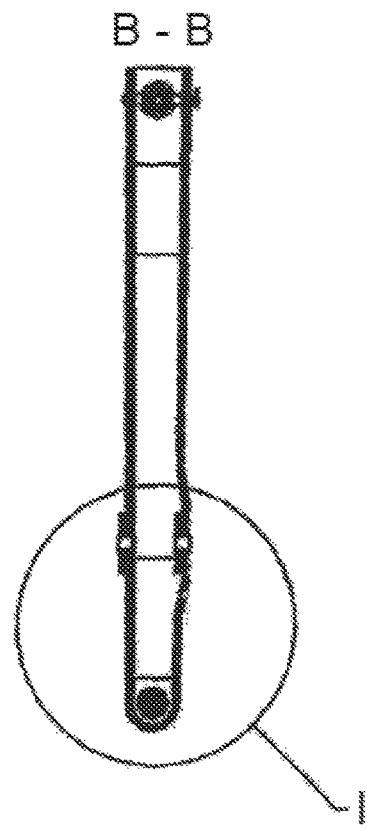
FIG. 2B shows a sectional view taken along B-B of the first embodiment of the strut shown in FIG. 2A.
Figure 2C:
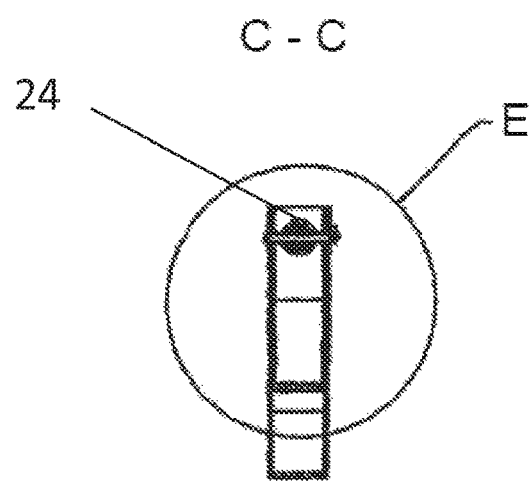
FIG. 2C shows a sectional view taken along C-C of the first embodiment of the strut shown in FIG. 2A.
Figure 2D:
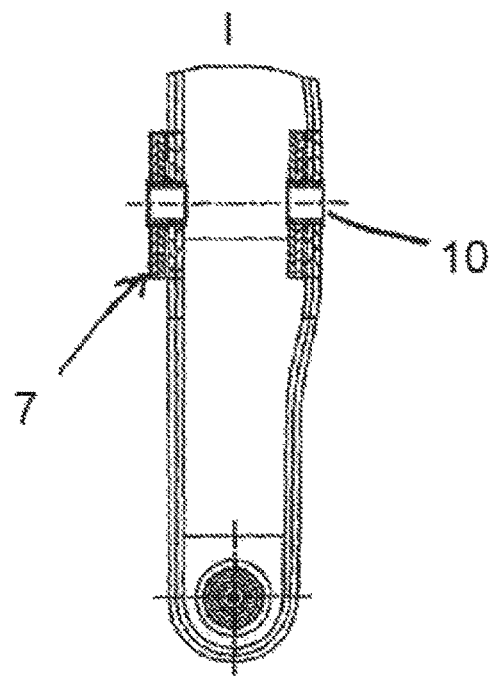
FIG. 2D shows a detailed view at section I of FIG. 2B.
Figure 2E:
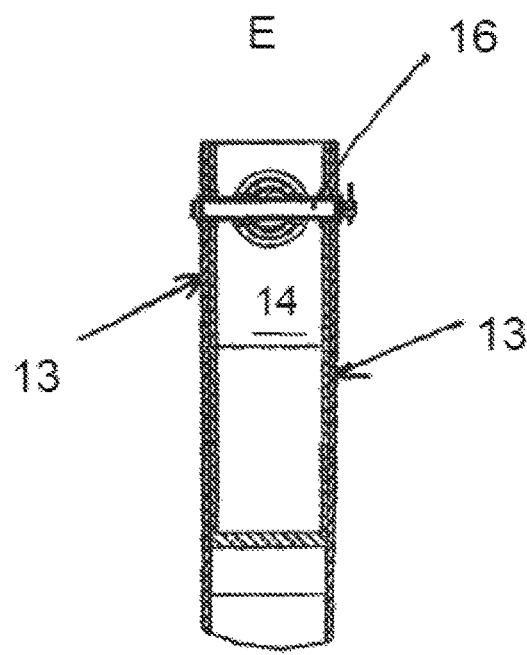
FIG. 2E: shows a detailed view at section E of FIG. 2C.
Figure 2F:
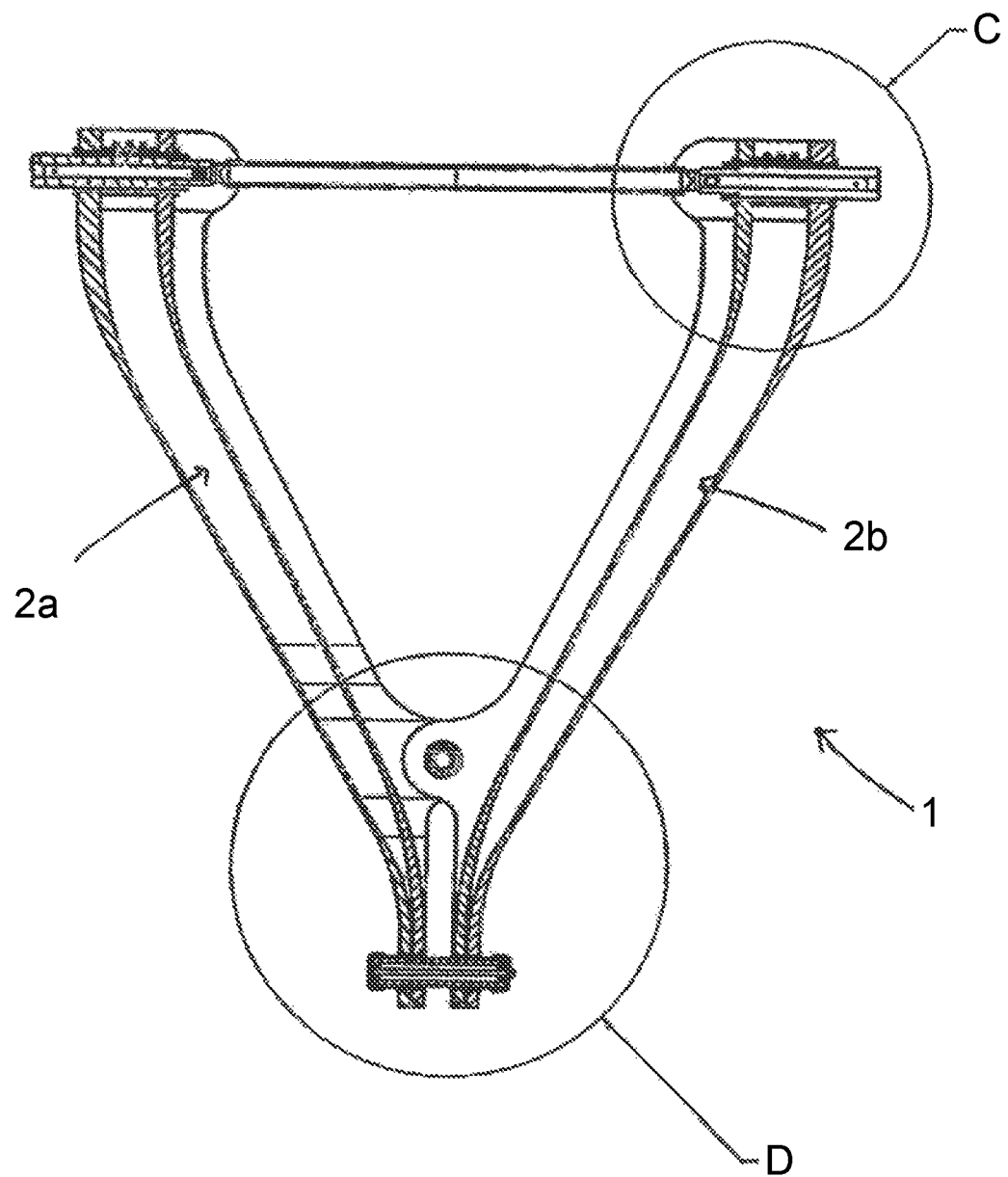
FIG. 2F shows a view of a section in a plane of the strut according to the first embodiment.
Figure 2G:
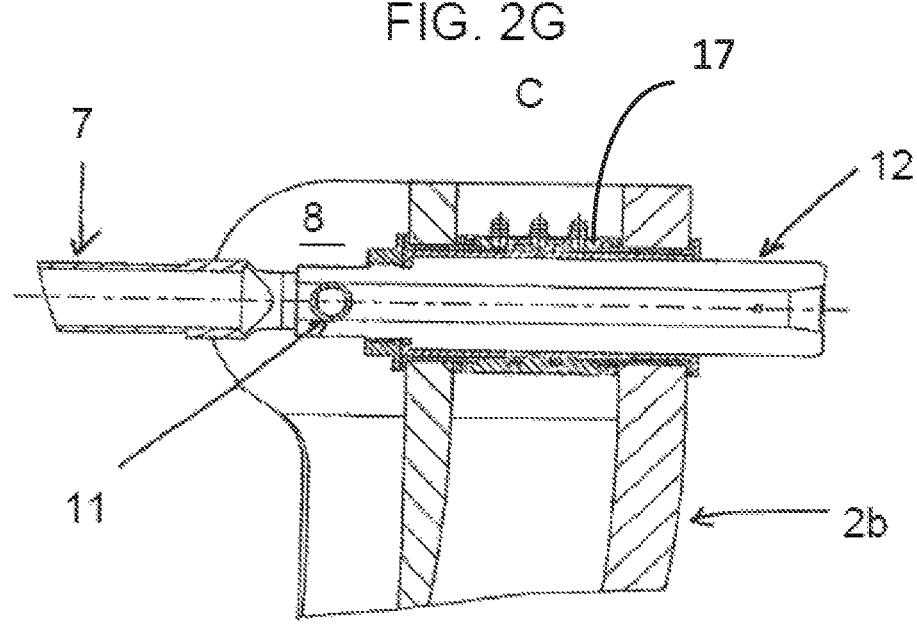
FIG. 2G shows a detailed view at section C of FIG. 2F.
Figure 2H:
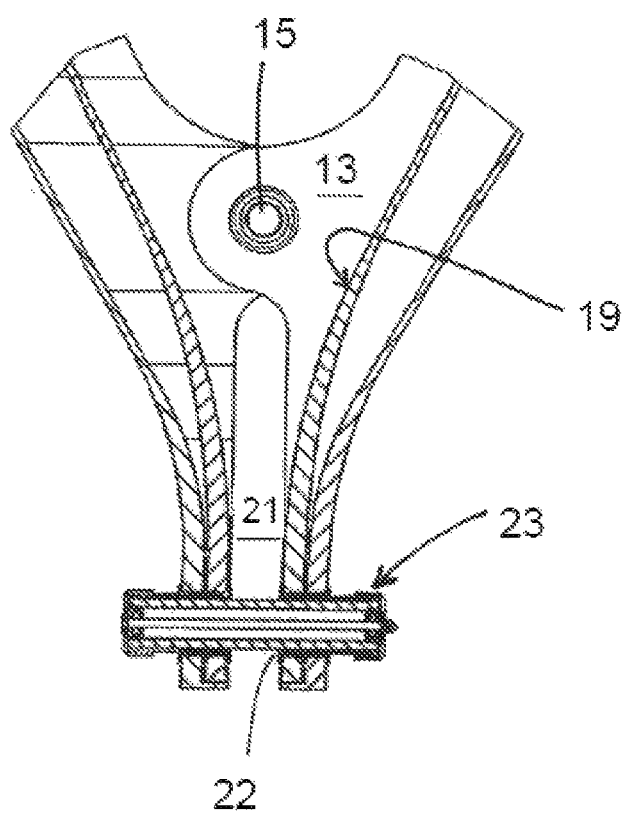
FIG. 2H shows a detailed view at section D of FIG. 2F.

FIGS. 2A-2H show a plurality of views of a first embodiment of a Y-shaped strut in accordance with the invention. A plan view is shown in FIG. 2A. Sectional views B-B and CC in accordance with the definition of FIG. 2A are respectively shown in FIGS. 2B and 2C. Detailed views I and E respectively in accordance with the definition of FIGS. 2B and 2C are shown in FIGS. 2D and 2E. A section in the plane of the strut is shown in FIG. 2F. Detailed views C and D respectively in accordance with the definition of FIG. 2F are shown in FIGS. 2G and 2H.

The strut in accordance with the embodiment shown in FIGS. 2A-2H comprises a Y-shaped structure 1 having bars 2a and 2b arranged in minor-inverted form. The bars are identical and are arranged in linear symmetry.

The bars 2a and 2b are curved in a slightly S shape. They have a first straight section in which the bars extend in parallel and form the trunk 3 of the structure. A first curved section that defines the branching point 4 of the structure adjoins the first straight section. A second straight section that defines the branches 5a and 5b of the structure adjoins the first curved section. A second curved section adjoins the second straight section and is configured such that prolongations 6a and 6b respectively of both bars 2a and 2b adjoining it that form the end region of the branches 5a and 5b respectively are again in parallel with one another.

The bars 2a and 2b are designed as square pipes in the region of the branches 5a and 5b, with them each being composed of 2 U sections or C sections and as an I section perpendicular to the plane of the structure in the region of the trunk 3.

The Y-shaped structure 1 furthermore comprises a cross web 7 that extends in the region of the prolongations 6a and 6b between the branches 5a and 5b. The cross web 7 is designed as a pipe section whose two ends are fixed at webs 8 of the prolongations 6a and 6b disposed in the plane of the structure. The webs 8 and the ends of the cross web 7 have holes 9 and 10 which extend normal to the plane of the Y-shaped structure 1 and through which bolts 11 are inserted for connecting the bars 2a and 2b respectively to the cross web 7.

Bearing pins 12 extending in the plane of the Y-shaped structure 1 are furthermore received at the prolongations 6a and 6b of the bars 2a and 2b for the pivotable connection of the strut to a fuselage. These bearing pins likewise have normal bores at their inner sides and are connected to the cross web 7 using the bolt 11.

The bars 2a and 2b are connected to one another at the branching point 4 of the Y-shaped structure. For this purpose, both bars 2a and 2b have two mutually facing webs 13, between which a mount 14 is formed, in the region of the first curved section. The webs 13 of the bars 2a and 2b are slightly offset from one another at this point, as can be seen, for example, from FIG. 2D. This can be achieved in that the webs 13 are slightly displaced out of the surface of the section in the identical bars 2a and 2b and thus mesh with one another with a minor-inverted arrangement of the bars 2a and 2b. The webs 13 have holes 15 which extend normal to the plane of the Y-shaped structure 1 and through which bolts 16 are inserted for connecting the bars 2a and 2b.

An auxiliary body 17 which is now shown in any more detail in the Figures can be arranged in the mount 14 of the male bar 2b and can comprise two oppositely disposed bearing surfaces which can contact the inner sides 19 of the bars 2a and 2b in the first curved region. The auxiliary body can be configured and arranged in a mirror-inverted manner with respect to the trunk axis. The auxiliary body can have a hole at the symmetry axis which extends normal to the plane of the structure 1 and which can be aligned with the holes 15 and through which the bolt 16 can be inserted to connect the auxiliary body to the bars 2a and 2b.

The auxiliary body can, for example, adopt the design of a funnel-like plate so that its bearing surfaces can contact the inner sides 19 of the bars 2a and 2b over the full area at the branching point. The auxiliary body can, for example, be H-shaped in cross-section so that the thickness of the plate increases in the region of the bearing surfaces to achieve a greater support surface. A sleeve engaging around the bolt 16 can in this case serve the compensation of the height difference between the auxiliary body and the mount 14. The mount 14 includes inwardly facing recesses 24.

The bars 2a and 2b extend in parallel with one another and at a spacing from one another that leaves an intermediate space 21 free in the region of the trunk 3 of the structure 1. At the end of the trunk 3, horizontal holes 22 are worked in both bars 2a and 2b that extend in the plane of the structure 1 and that are worked in for the mounting of a pin 23 for connection with a further component of the nose landing gear.

The two bars 2a and 2b, the cross web 7 and, optionally, the auxiliary body are components comprising fiber composite material, preferably CFC, that were manufactured using an RTM process or an automated tape laying process. All the holes in these components are lined with metal rings.

The Y-shaped structure 1 is therefore not produced as a single integral component, but rather comprises a plurality of separate and mechanically connected components, namely the bars 2a and 2b, the cross web 7, and optionally the auxiliary body. One bar 2a forms the first branch 5a and the other bar 2b forms the second branch 5b of the structure 1.

Figure 3A:
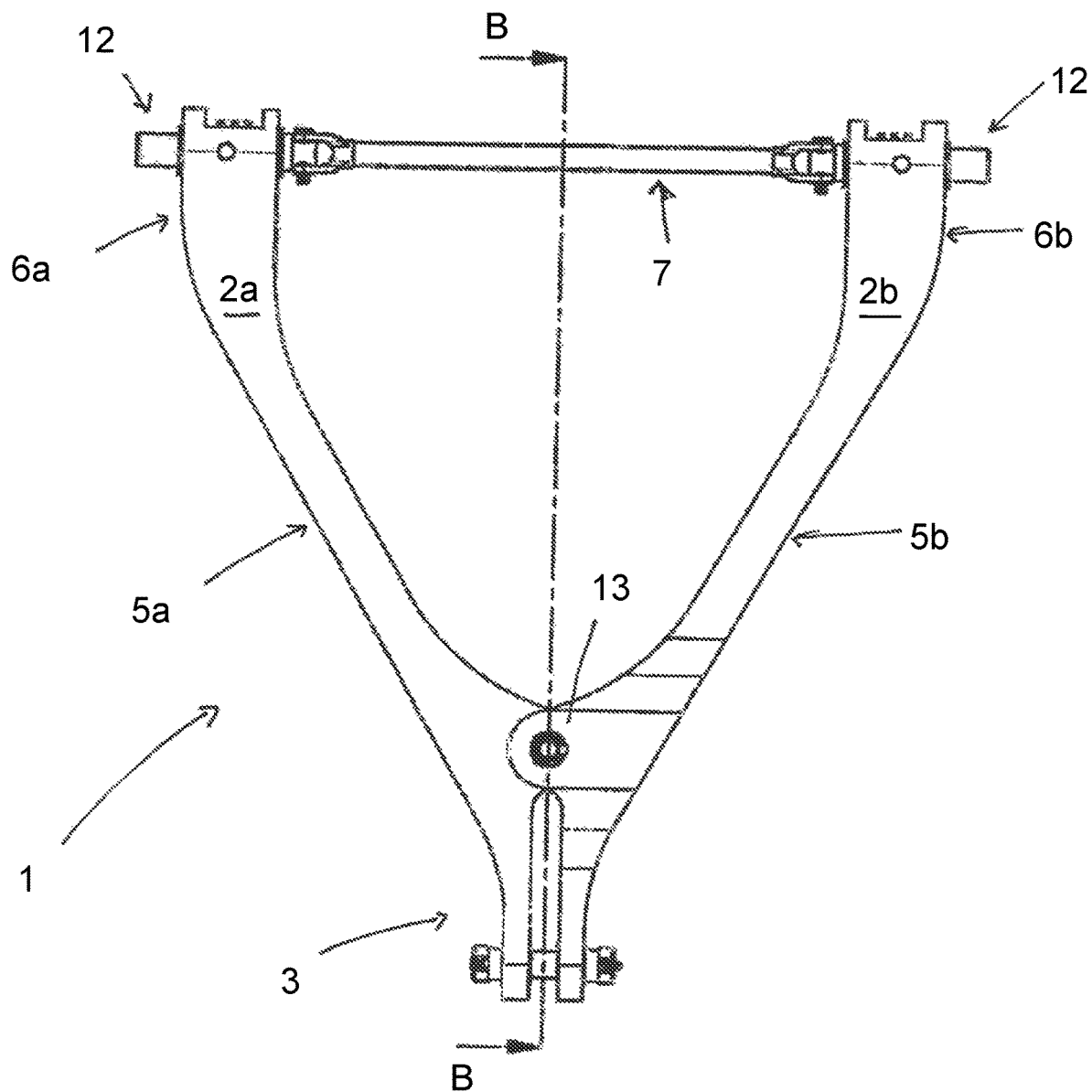
FIG. 3A shows a plan view of a second embodiment of the strut in accordance with the invention.
Figure 3B:
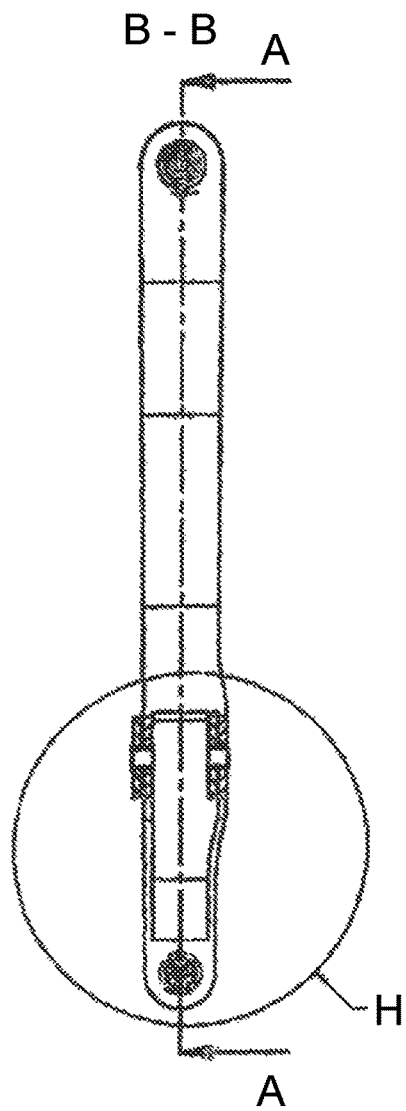
FIG. 3B shows a sectional view taken along B-B of the second embodiment of the strut shown in FIG. 3A.
Figure 3C:
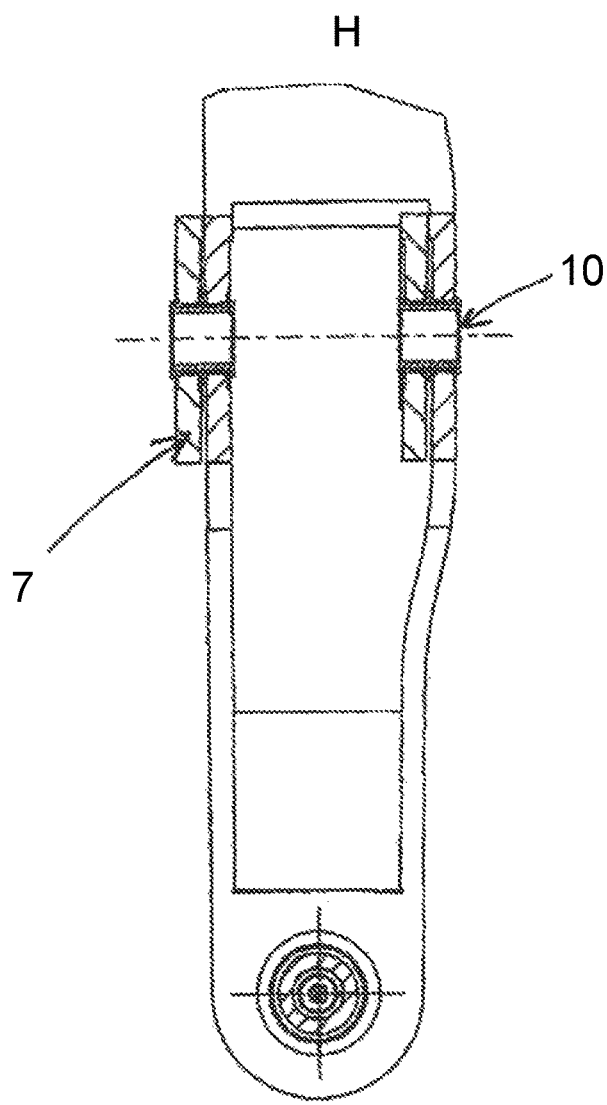
FIG. 3C shows a detailed view of FIG. 3B at section H.
Figure 3D:
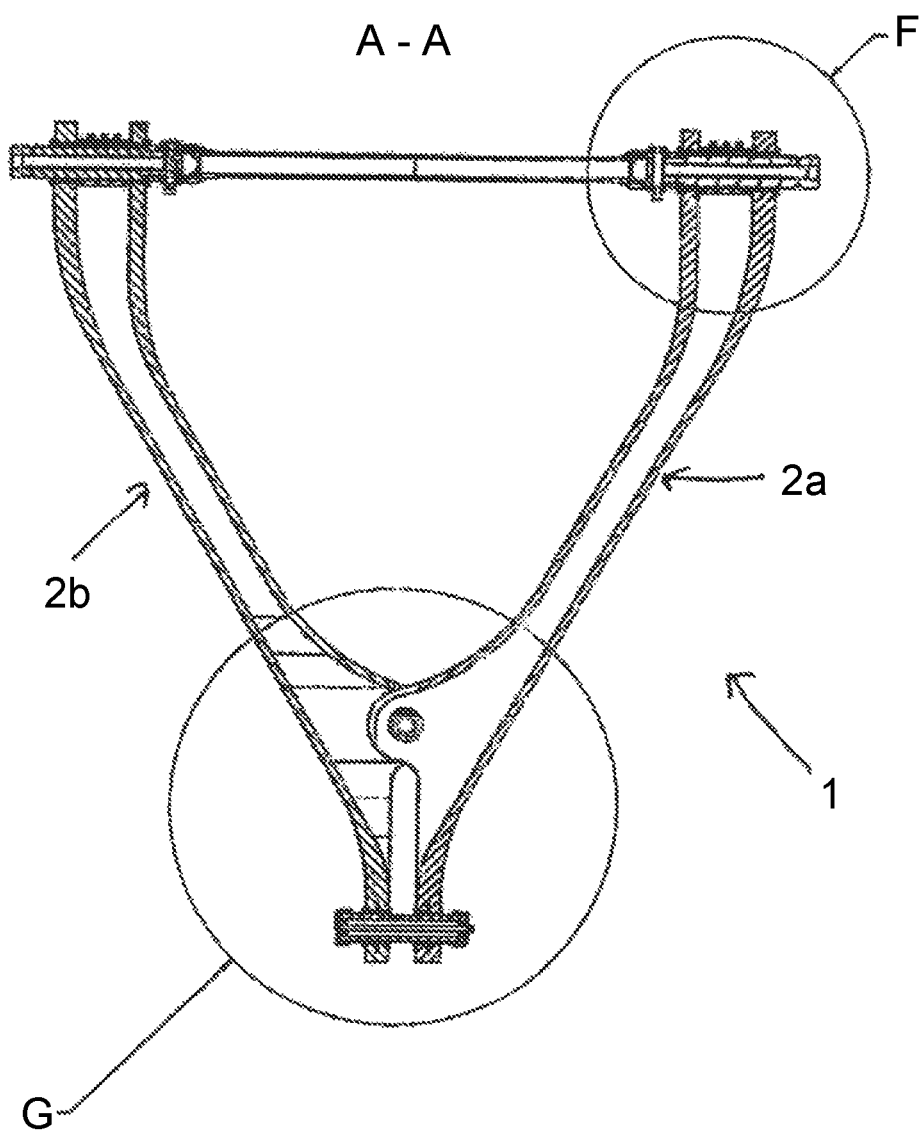
FIG. 3D shows a detailed sectional view of FIG. 3B taken along A-A.
Figure 3E:
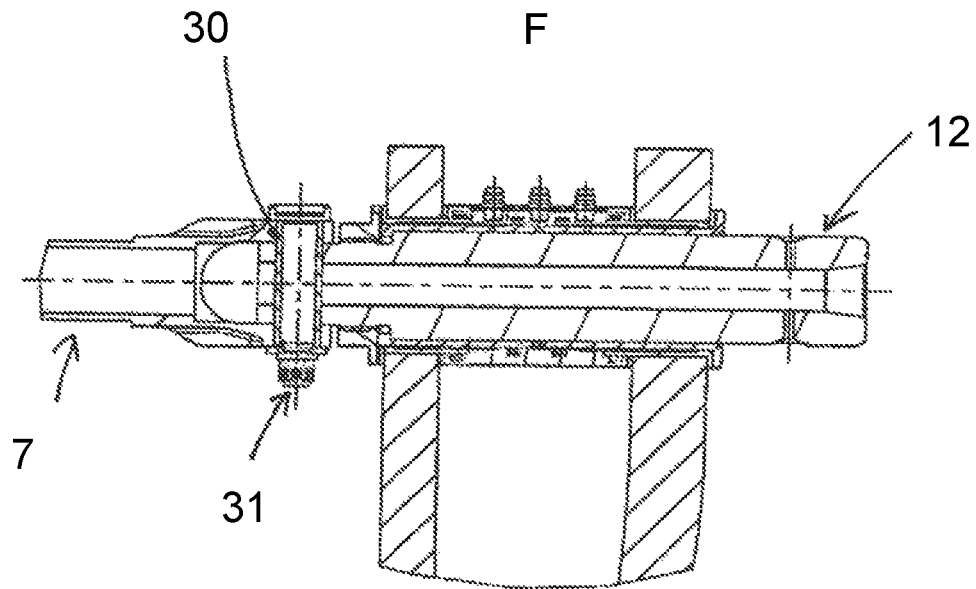
FIG. 3E shows a detailed view at section F of FIG. 3D.
Figure 3F:
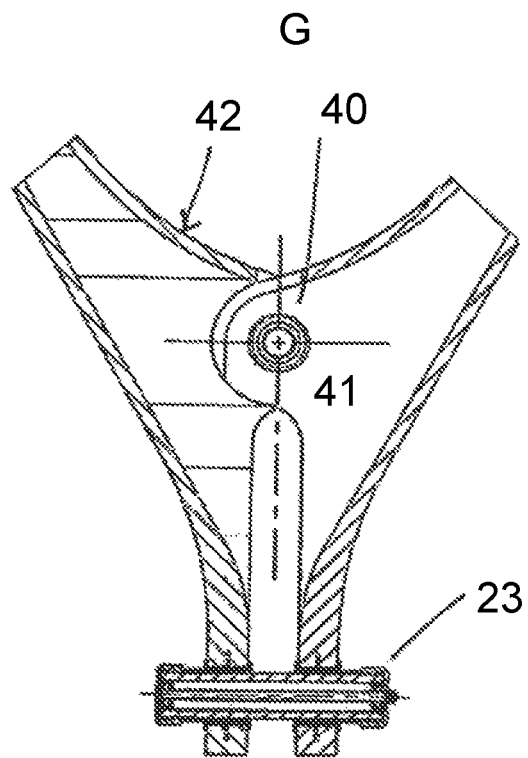
FIG. 3F shows a detailed view at section G of FIG. 3D.

FIGS. 3A-3F show a plurality of views of a second embodiment of a Y-shaped strut in accordance with the invention. A plan view is shown in FIG. 3A. A sectional view B-B in accordance with the definition of FIG. 3A is shown in FIG. 3B. A detailed view H in accordance with the definition of FIG. 3B is shown in FIG. 3C. A sectional view A-A in accordance with the definition of FIG. 3B is shown in FIG. 3D. Detailed views F and G respectively in accordance with the definition of FIG. 3D are shown in FIGS. 3E and 3F. Only differences from the embodiment in accordance with FIG. 2 will be discussed in the following. Parts corresponding to the strut in accordance with FIG. 2 are provided with identical reference numerals.

One difference with respect to the embodiment in accordance with FIG. 2 comprises the connection of the cross web 7 to the bars 2a and 2b. As can in particular be seen from FIG. 3e, only an indirect connection of the cross web 7 to the bars 2a and 2b respectively takes place, and indeed using the pin 12. The webs 8 present in the embodiment in accordance with FIG. 2 are missing as are the normal holes 9 and 10 and the normal bolt 11. Instead, the cross web 7 has transverse bores 30 disposed in the plane of the strut 1 at both ends and the bearing pins have corresponding transverse bores 30. Bolts 31 are inserted through these transverse bores 30 to connect the bearing pins 12 to the cross webs 7.

A further difference with respect to the embodiment in accordance with FIGS. 2A-2H comprises the configuration of the branching point 4, as can in particular be seen from FIG. 3F. In place of the prolongations 13, a molding 40 of the section-like bars 2a and 2b respectively is provided there. The vertical section walls 42 surround an intermediate space 41 that takes the place of the mount 14.

Figure 4C:
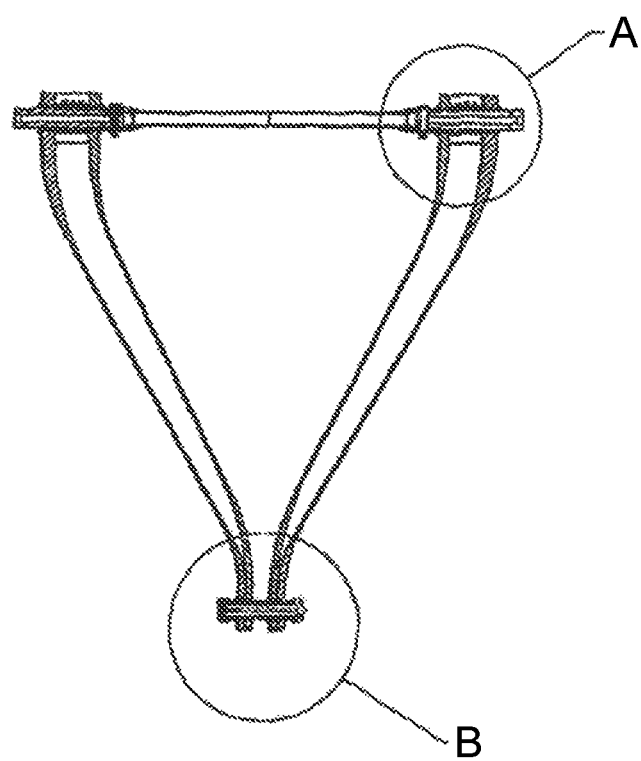
FIG. 4C shows a section in a plane of the strut according to the third embodiment of the strut.
Figure 4D:
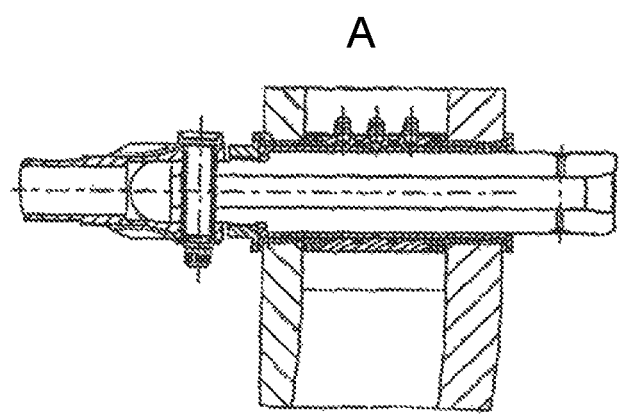
FIG. 4D shows a detailed view at section A of FIG. 4C.
Figure 4E:
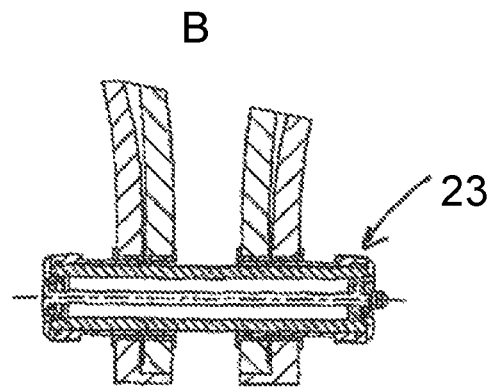
FIG. 4E shows a detailed view at section B of FIG. 4C.

FIGS. 4A-4E show a plurality of views of a third embodiment of a Y-shaped strut in accordance with the invention. A plan view is shown in FIG. 4A. A side view is shown in FIG. 4B. A section in the plane of the strut is shown in FIG. 4C. Detailed views A and B in accordance with the definition of FIG. 4C are shown in FIGS. 4D and 4E. Only differences from the embodiment in accordance with FIG. 3 will be discussed in the following. Parts corresponding with the struts in accordance with FIGS. 2A-2H and FIGS. 3A-3F are provided with identical reference numerals.

One difference with respect to the embodiment in accordance with FIGS. 3A-3F comprises the configuration of the branching point 4 such as can in particular be seen from FIGS. 4A, 4C, and 4E. In this embodiment, there is no connection of the bars 2a and 2b to the branching point. The two bars 2a and 2b are only connected to the end of the branches using the cross web 7 and to the end of the trunk using the pin 23. Correspondingly, the bars 2a and 2b are configured as continuous sections without prolongations 13 or moldings 40 in the region of the branching point. The linear symmetry of the bars 2a and 2b in this case corresponds to a mirror symmetry.

In summary, it results that the concept in accordance with the invention of a multi-part landing gear strut and preferably of a nose landing gear strut composed of fiber composite material, and preferably of CFC, can serve as a base to keep the use of material as small as possible and to assist fully automated production processes. This results in better efficiency. Based on two, optionally symmetrical, bars and on a transversely extending cross web, the simplified single parts can be manufactured, unlike with known Y struts, with a small material waste and without any great manual draping effort. A simple RTM shape can be used; only small machine reworking is necessary; and a high degree of automation can be achieved. The use of two separate bars prevents damage to the strut due to delaminations and fiber breaks, for example, on the basis of high tensions and shear forces at the branching point or elbow region. In case of damage or in the case of a production error, only the respective individual part has to be replaced and the other parts can still be used. The assembly of axial pins at the branches of the Y-shaped structure can take place from the inside to the outside since the cross web can be assembled after the installation of the axial pins.

The invention claimed is:

1. A strut for a landing gear of an aircraft, said strut comprising:
   a structure branched in a Y-shape, wherein the structure is produced in multiple parts and comprises at least two bars, with the at least two bars including a first bar forming a first branch of the structure and a second bar forming a second branch of the structure, and with both the first and the second bars partly or completely comprising a fiber composite material;
   bores passing through each of an exterior wall and an interior wall of each of the first and second branches; and
   bearing pins passing through each of the bores;
   a cross web mating with an interior end of each of the bearing pins, the bearing pins positioned in the first and second branches, and cross web bolts each passing through a bore in one of the bearing pins and a bore in the cross web to connect the cross web to the bearing pins and the first and second branches;
   a first web extending from the interior wall of the first branch and a second web extending from the interior wall of the second branch, a bolt passing through holes in each of the first and second webs to connect the webs; and
   a pin extending between holes in a lower end of each of the first and second branches to connect the first and second branches.

2. The strut in accordance with claim 1, wherein the first and second bars are identical; and/or wherein the first and second bars are arranged in linear symmetry or mirror symmetry with respect to one another.

3. The strut in accordance with claim 1, wherein the cross web partly or completely comprises a fiber composite material.

4. The strut in accordance with claim 1, wherein the first and second bars are connected to one another at a branching point or at a trunk of the structure.

5. The strut in accordance with claim 4, wherein the holes in each of the first and second webs extend normal to the bores.

6. The strut in accordance with claim 5, wherein the holes in each of the first and second webs extend normal to the bores.

7. The strut in accordance with claim 1, wherein an auxiliary body is arranged at a branching point between the first and second bars and comprises two oppositely disposed bearing surfaces that contact inner sides of the first and second bars.

8. The strut in accordance with claim 1, wherein the holes at the lower end of each of the first and second branches are parallel to the bores.

9. The strut in accordance with claim 1, wherein a trunk of the structure is comprised of the first bar and the second bar.

10. The strut in accordance with claim 9, wherein an auxiliary body partly or completely comprises a fiber composite material.

11. The strut in accordance with claim 10, wherein the cross web and/or the auxiliary body partly or completely comprise carbon fiber reinforced plastic.

12. The strut in accordance with claim 1, wherein the first and second bars partly or completely comprise carbon fiber reinforced plastic.

13. The strut in accordance with claim 1, wherein the landing gear of the aircraft is for a nose landing gear of the aircraft.

14. The strut of claim 1, wherein the bearing pins are coaxial with the cross web and the cross web mates with an end of each bearing pin extending past an interior wall.

15. The strut of claim 1, wherein the first web extends from the first branch and the second web extends from the second branch; and
   wherein the bolt passing through each of the first and second webs extends perpendicular to the bearing pins.

16. A method of manufacturing a strut, wherein the strut is for landing gear of an aircraft, said strut comprising:
   a structure branched in a Y-shape, wherein the structure is produced in multiple parts and comprises at least two bars,
   the at least two bars including a first bar forming a first branch of the structure and a second bar forming a second branch of the structure, and with both the first and the second bars partly or completely comprising a fiber composite material,
   wherein the manufacture of the first and second bars takes place as part of an injection molding process or as part of an automatic tape laying process; and
   subsequently connecting the completed first and second bars to one another via a cross web mating with an interior end of each of two bearing pins positioned in bores, the bores passing through each of an exterior wall and an interior wall of each of the first and second bars;
   connecting the cross web to the two bearing pins and the first and second branches by passing cross web bolts through a bore in each of the bearing pins and a bore in each side of the cross web;
   connecting a first web extending from the interior wall of the first branch and a second web extending from the interior wall of the second branch using a bolt passing through holes in each of the first and second webs; and connecting the first and second branches using a pin extending between holes in a lower end of each of the first and second branches.

17. The method of manufacturing the strut in accordance with claim 16, wherein an auxiliary body is received in holes through each of the exterior wall and the interior wall of each of the first and second branches.

18. The method of claim 16, wherein the cross web extends through an interior side of each of the first and second bars.

* * * * *